United States Patent [19]

Sheely

[11] 3,895,050
[45] July 15, 1975

[54] DISPOSAL OF WASTE MATERIALS FROM UNSATURATED NITRILE

[75] Inventor: Harold R. Sheely, Orleans, Mass.

[73] Assignee: The Badger Company, Inc., Cambridge, Mass.

[22] Filed: Nov. 8, 1973

[21] Appl. No.: 414,076

Related U.S. Application Data

[63] Continuation-in-part of Ser. No. 168,134, Aug. 2, 1971, abandoned.

[52] U.S. Cl. .......... 260/465.3; 260/294.9; 260/464; 260/465 C; 260/465.9
[51] Int. Cl. .......................................... C07c 121/02
[58] Field of Search.......... 260/465.3, 465.9, 465 C, 260/465 K, 465.8 R, 464

[56] References Cited
UNITED STATES PATENTS

| | | | |
|---|---|---|---|
| 3,201,918 | 8/1965 | Sennewald et al. | 260/465.3 |
| 3,535,849 | 10/1970 | Hausweiler et al. | 260/465.9 X |
| 3,636,067 | 1/1972 | Lovett et al. | 260/465.9 X |
| 3,661,723 | 5/1972 | Ohashi et al. | 260/465.9 X |

*Primary Examiner*—Joseph P. Brust
*Attorney, Agent, or Firm*—Schiller & Pandiscio

[57] ABSTRACT

A method of recovering and disposing of waste materials from a plant for manufacturing unsaturated aliphatic nitriles or aromatic nitriles whereby waste water, unreacted ammonia and by-products such as HCN and acetonitrile are not condensed but remain with the absorber off-gas for ultimate disposal by incineration. The method employs a hydrocarbon solvent to adiabatically quench the reactor effluent and, after removal of polymer by-products, the partially quenched effluent is passed to a hot absorber column where the nitrile product but no ammonia and only some of the HCN are absorbed by the hydrocarbon solvent. The nitrile-solvent mixture is distilled to separately recover the solvent and nitrile product. The solvent is recycled. The hot absorber off-gases are cooled to recover water and then incinerated, with ammonia, HCN, acetonitrile and some vaporized solvent furnishing the necessary fuel values. In a preferred embodiment, solvent in the absorber overhead vapors is recovered by scrubbing with a high boiling oil.

11 Claims, 2 Drawing Figures

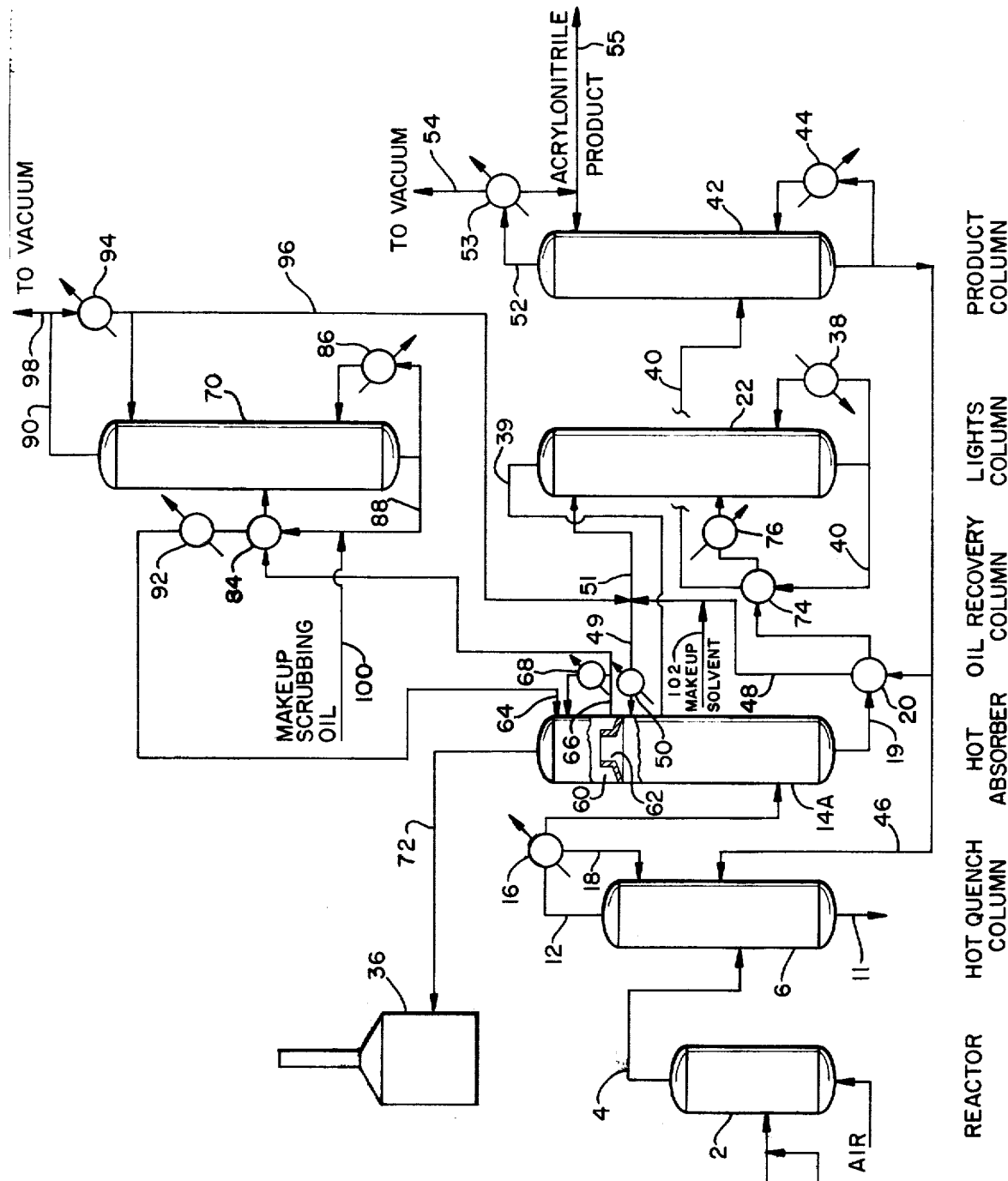

DISPOSAL OF WASTE MATERIALS FROM UNSATURATED NITRILE

This application is a continuation-in-part of copending application Ser. No. 168134 filed Aug. 2, 1971 for Disposal of Waste Material from Unsaturated Nitrile Plant (now abandoned).

This invention relates to the manufacture of unsaturated nitriles and more particularly to a process for disposing of waste materials from an acrylonitrile or methacrylonitrile plant.

BACKGROUND OF THE INVENTION

Various processes are known in the art for manufacturing unsaturated aliphatic and aromatic nitriles. For example, U.S. Pat. Nos. 2904580, 3005517, 3044966, 3050546, 3197419, 3198750, 3200084, 3230246, 3248340, 3354197, 3365482, 3404947, 3427343, 3431292, 3433823, 3442771, 3472892; British Pat. Nos. 874593 and 904418; Belgium Pat. Nos. 592434, 593097, 598511, 603030, 612136, 615605, 603031; Canadian Pat. No. 619497 and French Pat. No. 1278289 teach various processes and catalysts for the ammoxidation of an olefin to produce an unsaturated nitrile. According to these teachings, an olefin such as propylene or isobutylene is reacted with ammonia and molecular oxygen in the vapor phase in the presence of a selected catalyst to produce the corresponding unsaturated nitrile such as acrylonitrile or methacrylonitrile respectively. U.S. Pat. No. 3,670,009 teaches another process for manufacturing unsaturated nitriles which involves ammoxidation of a saturated hydrocarbon. According to this latter patent one or more saturated hydrocarbons having from three to twelve carbon atoms may be converted to unsaturated nitriles by vapor phase ammoxidation of the hydrocarbon in the presence of a selected catalyst which contains, as the essential ingredients, molybdenum, boron and tin. Still another process for manufacturing unsaturated nitriles from saturated hydrocarbons, in particular cyclohexane, is taught in British Pat. No. 1,195,037. According to this latter patent, an aliphatic acylic dinitrile may be produced by ammoxidation of cyclohexane in the presence of a selected catalyst comprising a compound of antimony or molybdenum, doped with a halogen. According to British Pat. No. 1,195,037 cyclohexene may also be used in place of the cyclohexane. On the other hand, Mekhtiev et al., report in *Chemical Abstracts*, Vol. 65:3787g (1966) that ammoxidation of 1, 2-dimethylcyclohexane produces a mixture of phthalonitrile and phthalimide, and ammoxidation of 1, 3-and 1, 4-dimethylcyclohexane produces a mixture of iso- and tetraphthalonitrile. Still another process for producing unsaturated nitriles involves ammoxidation of $\alpha,\beta$-unsaturated aliphatic aldehydes susch as acrolein, methacrolein or crotonaldehyde, or compounds giving rise to such aldehydes under the reaction conditions taught in British Pat. No. 719,635. U.S. Pat. No. 3,312,710 and British Pat. No. 1,246,108 teach that aromatic nitriles may be prepared by reacting alkyl-substituted aromatic compounds such as methyl-substituted benzenes or methyl-substituted pyridines, ammonia and oxygen over a selected catalyst at elevated temperature. On the other hand, British Pat. Nos. 1,195,036 and 1,195,037 teach that aliphatic dinitriles such as adiponitrile may be prepared by ammoxidation of cyclohexane or cyclohexene. U.S. Pat. Nos. 2499055 and 2828325 teach that aromatic nitriles may also be produced by the ammoxidation of an alkyl or alkenyl substituted benzene or naphthalene, or the corresponding alcohol, aldehyde or ketone which is an intermediate oxidation product of such substituted benzene or naphthalene.

The reaction effluent will also usually contain an appreciable amount of unreacted ammonia, some unreacted feed materials, e.g. propylene or isobutylene, oxygen, nitrogen (particularly if air is used as the source of molecular oxygen) and also one or more other reaction by-products such as water, hydrogen cyanide, acrolein, nethacrolein, by-product saturated aliphatic nitriles such as acetonitrile and propionitrile, etc. The desired reaction product is generally recovered in a refrigerated absorber by absorption in a suitable solvent such as water, during which step some additional relatively heavy organic compounds may be formed. The absorption is usually done after the reaction effluent is counter-currently scrubbed with a dilute mineral acid is a quench tower. The acid, typically sulfuric, reacts with the ammonia to form an ammonia salt and thereby makes the ammonia unavailable for the formation of undesired by-products, e.g., the formation of aminoproprionitrile or aminodiproprionitrile resulting from the direct reaction of ammonia and acrylonitrile. However, some cyanoethylation still takes place and these by-products tend to react with other constituents of the reactor effluent to form various polymers. Some of these polymers are relatively heavy and almost all of them are characteristically soluble in water. For example, in the manufacture of acrylonitrile, the dilute water solution of the ammonia salt issuing from the bottom of the quench tower typically contains some acrylonitrile and other reaction products but is contaminated with organic "heavies" such as carbonyl polymers, hydrolyzed polyacrylonitrile, polyacrylamide, and cyanoethylated side reaction products. The overhead from the quench tower is led into the absorber while the bottoms from the quench tower is split into two streams, one of which is cooled and recycled to the quench tower and the other of which is a waste-water stream. Dissolved acrylonitrile and usually one or more other compounds such as acetonitrile, hydrogen cyanide, proprionitrile, etc. are recovered from this waste stream by conventional means, e.g., stream stripping.

One of the most pressing problems associated with plants for producing unsaturated aliphatic-, and aromatic-nitriles according to processes as above described is the ultimate disposal of waste by-products. For example, typically in an acrylonitrile plant the waste treatment facilities may include a vent stack for off-gases, a flare stack for relief valves, an incinerator for HCN, acetonitrile, and organic waste streams, an ammonium salt (e.g., ammonium sulfate) recovery plant, and an additional incinerator or biological waste treatment unit for waste-water streams. However, such facilities are expensive and do not provide a satisfactory solution to the problem of disposing of waste materials in a manner that meets governmental standards. A further problem is that certain of the by-products have only limited sales appeal.

SUMMARY OF THE INVENTION

Accordingly, the primary object of this invention is to provide a new and improved process for recovering and disposing of waste materials from plants for manufacturing unsaturated aliphatic nitriles or aromatic nitriles.

It is recognized that incineration is the only practical way of effectively disposing of many industrial waste materials that are toxic, hazardous or expensive to store, or of a nature as to require extensive degradation treatment before being discharged into natural bodies of water. Therefore, a further object of this invention is to provide in a plant for the manufacture of unsaturated aliphatic nitriles such as acrylonitrile and methacrylonitrile, and aromatic nitriles such as benzo-nitrile, an improved method of recovering by-product waste materials whereby said materials may be ultimately disposed of by incineration.

Essentially the invention provides a method whereby waste water, unreacted ammonia, and by-product HCN and by-product saturated nitriles such as acetonitrile are not condensed but remain with the absorber off-gas for ultimate disposal by incineration. The reaction effluent is first passed to a quench chamber where it is subjected to a hot adiabatic quench in which either water or a hydrocarbon solvent (and preferably both) furnish direct cooling via evaporation, with the result that any by-product polymers are condensed. The condensed polymers and any catalyst fines entrained in the reaction effluent are flushed out of the system in a small stream of unvaporized solvent. The partially quenched effluent recovered from the quench column is then passed to an absorber column which operates at a temperature above the dew point of water and uses a hydrocarbon solvent as the absorption medium for the unsaturated nitrile product, whereby practically no ammonia and little or no HCN are absorbed because of their high vapor pressures and only a portion of whatever saturated nitrile by-product, e.g., acetonitrile and propionitrile, are present, is absorbed because of non-ideality in the hydrocarbon solvent. The small amounts of these materials that are absorbed are substantially all removed as overhead in a lights distillation column using a small stream of hydrocarbon as reflux. The overhead from the lights column is recycled to the absorber. The unsaturated nitrile product leaves the bottom of the lights column in admixture with the hydrocarbon solvent and is recovered as high purity product in a succeeding product column. Solvent recovered in the products column is recycled to the absorber and lights column. The hot absorber off-gases may be treated to recover hydrocarbon solvent (which is recycled to the system) and are then incinerated, with the ammonia, HCN, and the undesired by-product nitriles, e.g., acetonitrile and propionitrile produced in the manufacture of acrylo- and methacrylonitrile, and some vaporized solvent furnishing the required fuel.

Other objects, features and advantages of the invention are set forth in or rendered obvious by the following detailed description of the invention which is to be considered together with the accompanying drawings.

BRIEF DESCRIPTION OF THE DRAWING

FIG. 2 is a modification of the system of FIG. 1 constituting a preferred embodiment of the invention.

DETAILED DESCRIPTION OF THE INVENTION

Figure 1:
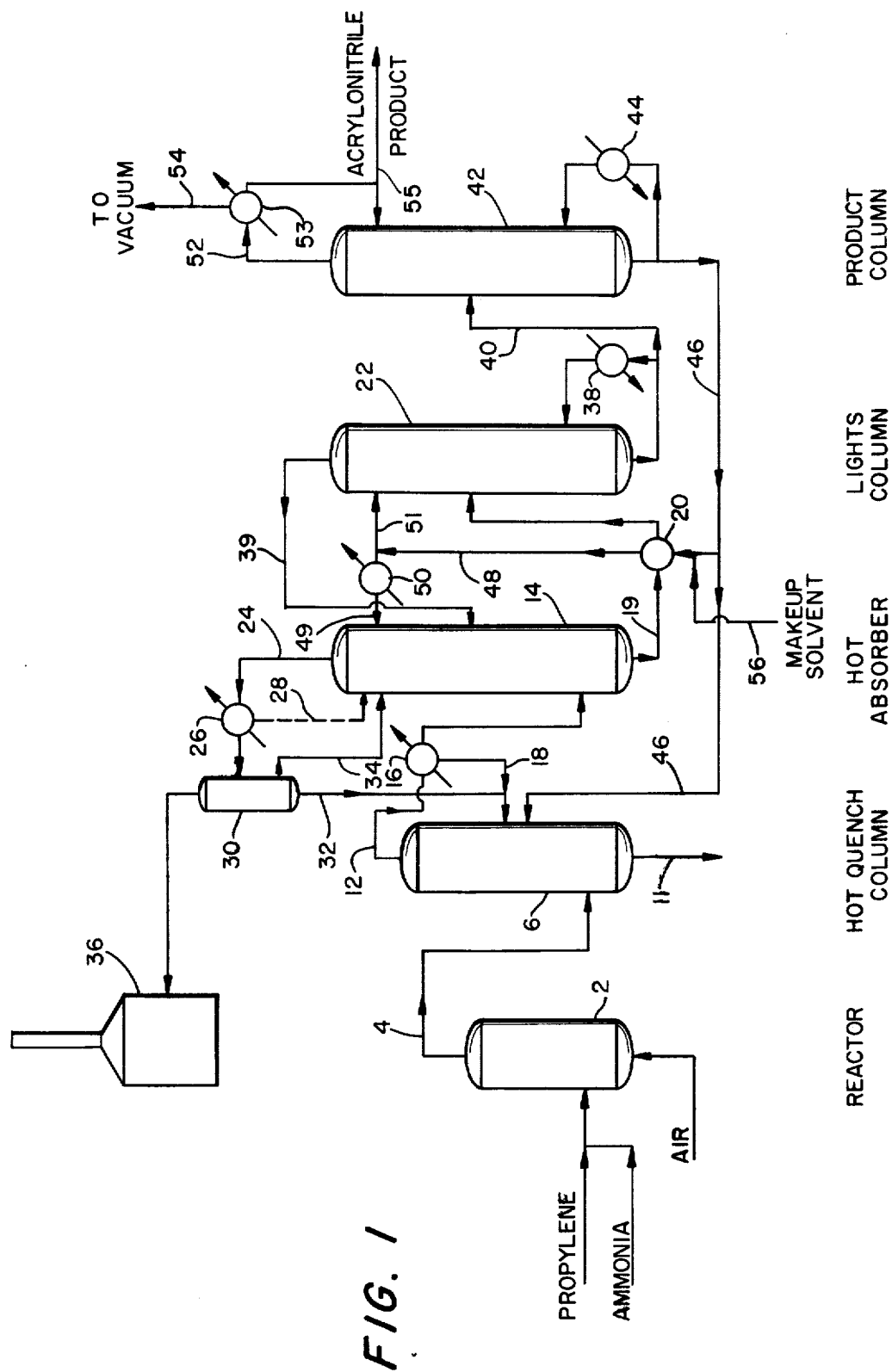
FIG. 1 shows a system for processing the effluent from an acrylonitrile reactor according to this invention.

The following is a more detailed description of the instant invention as applied to a process for producing acrylonitrile. The system of FIG. 1 includes a reactor 2 in which propylene, ammonia and oxygen (supplied as air) undergo reaction in the vapor phase in the presence of a selected catalyst to produce acrylonitrile. It is to be understood that the manner in which this reaction is conducted is well known and not critical to the present invention. Thus the reaction may be carried out using a fixed catalyst bed employing a pelleted catalyst. Alternatively, and preferably, a so-called "fluidized bed" is employed. The fluidized bed is preferred since it permits close control of the temperature of the reaction. The bed may be fluidized by the air supplied to the reaction.

Typically, as disclosed in the prior art, the reaction is carried out at a temperature in the range of from about 600° to 1,000°F, preferably between about 800° and 950°F, at atmospheric or slightly above atmospheric (2 to 3 atmospheres) pressure. Contact times in the range of about 0.1 to about 50 seconds (preferably from 1 to 15 seconds) may be employed. The molar ratio of ammonia to olefin feed may vary between about 0.05:1 to 5:1 and the molar ratio of oxygen to olefin feed may vary from 0.5:1 to 3:1. The molecular oxygen may be supplied as pure oxygen or air, with air usually being used for economic reasons. It also is recognized that in some instances beneficial effects are obtained by adding water to the reaction mixture. A number of catalysts disclosed in the prior art may be used to produce the unsaturated nitrile product. Among these are bismuth phosphotungstate and the bismuth, tin and antimony salts of phosphomolybdic and molybdic acids, e.g., bismuth phosphomolybdate (see U.S. Pat. No. 3050546), oxides of bismuth, molybdenum and silicon promoted by oxides of boron and bismuth (see U.S. Pat. No. 3354197). Other suitable catalysts are described in U.S. Pat. Nos. 3230246, 3427343 and 3431292. Since the reaction is exothermic, the reactor 2 is provided with suitable means (not shown) to carry off heat liberated in the course of the reaction.

The reaction vapor effluent is removed from reactor 2 via a line 4 and passes into a quench column 6. In quench column 6 the reaction effluent is subjected to a hot adiabatic quench in which evaporation of a water stream or a hydrocarbon solvent stream provides direct cooling. The reaction effluent is cooled just enough to condense any polymer by-products present therein. Condensed polymer by-products and catalyst fines (if present in the reactor effluent) are removed from the bottom of the quench column via line 11 in a relatively small stream of unvaporized solvent. Although not shown, it is to be understood that the quench column bottoms may be treated to recover the catalyst fines and hydrocarbon solvent for reuse in the system. The polymer by-products may be disposed of by incineration.

The overhead from the quench column contains the acrylonitrile reaction product plus unreacted ammonia, vaporized water and hydrocarbon solvent, HCN, and other reaction by-products such as acetonitrile and propionitrile. This overhead is passed via a line 12 to an absorption column 14. The overhead may be passed to column 14 either directly or by way of a condenser 16 where water and optionally the hydrocarbon solvent are condensed by heat exchange with a suitable cooling medium, e.g., water. The water and hydrocarbon solvent condensed out of the quench column overhead are recycled via a line 18 to the top of the quench column for further quenching. The partially quenched overhead vapors are contacted in absorption column 14 with the hydrocarbon solvent as the absorption medium. The hydrocarbon solvent is an oil preferably having a boiling point in the order of 350°F. It may be paraffinic or aromatic. A kerosene fraction is the preferred solvent. Contact is preferably achieved by counter-contact flow of the overhead vapors and the solvent. As a result of such contact, substantially all of the acrylonitrile is absorbed by the solvent and recovered as bottoms. The absorption column 14 operates at a temperature above the dew point of water, i.e., preferably at a temperature between 0° to about 50°F higher than the temperature of the partially quenched gas stream entering the absorber. At this temperature, practically none of the ammonia and only a minor fraction, if any, of the HCN are absorbed because of their high vapor pressures. Additionally, only a portion of the acetonitrile, propionitrile, and water are absorbed because of non-ideality in the hydrocarbon solvent. The absorber bottoms stream, containing the acrylonitrile and whatever by-products are absorbed by the solvent, is passed via a line 19 and a heat exchanger 20 to a "lights" removal column 22, while the hot absorber off-gases recovered as overhead are treated to recover solvent and optionally water. This is achieved by passing the off-gases via a line 24 through a condenser 26 where sufficient cooling is achieved by exchange of heat with a suitable cooling medium such as water to condense out solvent and also some water. It is to be noted that if condenser 16 is employed to recover water from the overhead of the quench column, the amount of water in the overhead from the absorber column will be quite small and hence whatever solvent and water are condensed in condenser 26 may be recycled directly to the absorber column via a line 28. If condenser 16 is omitted, line 28 also is omitted and the overhead from the absorber column is passed from condenser 26 to a decanter 30 where the condensed solvent and water are spearated by decantation and recycled to the quench column and the absorber column respectively via lines 32 and 34. The partially cooled off-gases are then passed directly to an incinerator 36 where ammonia, HCN, acetonitrile, propionitrile and any uncondensed hydrocarbon solvent furnish the necessary fuel values.

In the lights removal column 22, the bottoms product from the absorber is separated by distillation so that HCN, acetonitrile, propionitrile and the like are recovered as overhead and the acrylonitrile and solvent are recovered as bottoms. The necessary heat for operation of the lights column may be provided by a reboiler arrangement consisting of a heat exchanger 38 with steam or hot oil as the heating medium. The lights overhead may be sent to the incinerator, either directly or through condenser 26; preferably, however, it is recycled via a line 39 to the absorber. The lights column bottoms is passed via a line 40 to a product recovery distillation column 42 where the solvent is recovered as a bottoms product and substantially pure acrylonitrile is recovered as overhead via a line 52 and a condenser 53. Any inert gases in the overhead are withdrawn via a line 54 which in connected to a source of vacuum. Some of the acrylonitrile is returned to the top end of product column 42 and the remainder is passed via a line 55 to product storage means (not shown). Reboiling in column 42 is accomplished by means of a heat exchanger 44 employing steam or a hot oil as the heating medium. The solvent recovered from column 42 is recycled to quench column 6 via line 46 and to absorber column 14 via lines 46, 48, and 49. Some of the recovered solvent is also refluxed via lines 46, 48 and 51 to lights column 22 whereby recovery of lights is achieved by extractive distillation. If desired, the solvent recovered from column 42 may be passed to a solvent cleanup column (not shown) to effect removal of any heavy organic products present therein and then the purified solvent may be returned to columns 6, 14, and 22. It is preferred to pass at least some of the recovered solvent through heat exchanger 20 for heating the bottoms stream of the absorber column being delivered to the lights column. Since the absorber column is generally operated at a lower temperature than the lights column, the solvent recycled to the absorber from column 42 is passed through another heat exchanger 50 where it is cooled by exchange of heat with a suitable cooling medium such as water.

It is to be noted that the solvent has a boiling point higher than the temperature at which the partially condensed effluent is recovered from the upper end of the quench column. Nevertheless, the partially condensed effluent is saturated with hydrocarbon solvent vapor due to the partial pressure of the solvent being less than its vapor pressure. The part of the solvent which is not vaporized forms the stream which washes condensed polymers and catalyst dust out of the bottom of the quench column.

The preferred embodiment of the invention is illustrated in FIG. 2. It is to be noted that numerals used in FIG. 1 are used to designate the same equipment in FIG. 2. Except as otherwise stated hereinafter, the equipment, materials requirements and operating conditions of the embodiment of FIG. 2 are the same as that described above in connection with FIG. 1.

Turning now to FIG. 2, propylene, ammonia and oxygen in the form of air are reacted in reactor 2 and the reaction effluent is passed to quench column 6. In quench column 6 the reaction effluent is subjected to a hot adiabatic quench in which evaporation of water and a hydrocarbon solvent provides direct cooling sufficient to condense any polymer by-products present in the effluent. Any such condensed polymer by-products are washed out of the bottom of the quench column via line 11 in a stream of unvaporized solvent. The overhead from column 6 is passed to an absorption column 14A via line 12 and condenser 16. Some of the water and hydrocarbon solvent in the overhead are condensed in condenser 16 and recycled to the quench column via line 18. Additional hydrocarbon solvent is fed to the quench column via line 46.

The partially quenched overhead from the quench column is contacted in absorption column 14A with the hydrocarbon solvent as the absorption medium. Absorption column 14A is the same as absorption column 14 except that it includes a scrubbing section 60 at its top end in which the absorber overhead vapors are scrubbed with a high boiling oil to reduce process oil losses. Absorption column 14A comprises a plurality of trays or plates of suitable design for providing counter-current contact and includes a large liquid collector tray 62 demarcating the bottom of its scrubbing section. The hydrocarbon solvent, e.g., a kerosene boiling at about 350°F, is introduced to the absorption column 14A at a selected point close to but below its scrubbing section via line 49. The high-boiling scrubbing oil, e.g., a hydrocarbon fraction boiling at about 550°F, is introduced to the upper end of scrubbing section 60 via a line 64. The same oil and hydrocarbon solvent scrubbed out of the absorber overhead vapors are removed from collecting tray 62 via a line 66. Part of this recovered oil-solvent mixture may be cooled in a water-cooled heat exchanger 68 and returned to the scrubbing section 60. The remainder is passed to an oil recovery column 70. The scrubbed absorber overhead vapors are passed directly to incinerator 36 via a line 72.

Substantially all of the acrylonitrile in the overhead from quench column 6 is absorbed by the hydrocarbon solvent in absorber column 14A and is recovered as bottoms via line 19. This bottoms stream, which is substantially free of the high boiling scrubbing oil, passes to lights column 22 via heat exchanger 20 and two additional heat exchangers 74 and 76. It recovers heat in exchanger 20 from the bottoms of product column 42, picks up additional heat in exchanger 74 from the bottoms of lights column 22, and then is raised to a still higher temperature by exchange of heat with steam supplied to exchanger 76.

In lights column 22, the bottoms product from the absorber is separated by distillation so that HCN, acetonitrile, propionitrile and the like are recovered as overhead and the acrylonitrile and solvent are recovered as bottoms. The lights column overhead is recycled via line 39 to the absorber, while the lights column bottoms is passed via a line 40 and heat exchanger 74 to the product distillation column 42 where substantially pure acrylonitrile is recovered as overhead product and the solvent is recovered as a bottoms product. The latter is recycled to quench column 6 via line 46 and also to absorber column 14A via lines 48 and 49 and heat exchangers 20 and 50. In heat exchanger 50 the solvent is cooled by exchange of heat with cooling water. Some of the recovered solvent is also refluxed to lights column 22 via lines 48 and 51 to permit recovery of lights by extraction distillation as described in connection with FIG. 1. The acrylonitrile product recovered as overhead from column 42 is condensed in condenser 53 and then part of it is recycled to column 42 while the remainder is passed to product storage means (not shown) via line 55. Any inert gases present in the overhead are withdrawn via line 54 which is connected to a source of vacuum. These inert gases may be vented directly to the atmosphere or may be passed to incinerator 36 for dilution of absorber off-gases.

The mixture of scrubbing oil and solvent withdrawn from the absorber via line 66 is introduced to oil recovery column 70 via a heat exchanger 84 where it is heated by recovery of heat from the bottoms fraction of recovery column 70. The latter preferably is operated at a pressure less than atmospheric so as to reduce the amount of heat required to be supplied to its reboiler 86 which is heated by steam or hot oil. In column 70 the mixture of scrubbing oil and solvent are separated by fractional distillation into a bottoms product and an overhead product recovered via lines 88 and 90 respectively. The scrubbing oil bottoms product is passed through heat exchanger 84 and then through a water-cooled heat exchanger 92 back to the absorber via line 64, while the solvent overhead is condensed in a condenser 94 and then returned to the absorber and lights columns via a line 96 and lines 49 and 51. The reduced pressure in column 70 is established by connecting the overhead-carrying side of condenser 94 to a source of a vacuum via a line 98. Makeup scrubbing oil is supplied to the system via a line 100 that connects to line 88. Makeup solvent is supplied to the system via a line 102 that connects to line 48.

It is believed to be obvious that the purpose of using the scrubbing oil to recover solvent from the absorber overhead vapors is to minimize loss of solvent to the incinerator. Accordingly, a variety of oils (aromatic or paraffinic) may be used for scrubbing the hydrocarbon solvent. The primary requirement is that the scrubbing oil must have a higher boiling point than the solvent. Additionally it must (a) not react (under the operating conditions to which it is exposed) with the acrylonitrile and the other components of the reactor effluent, (b) not react with the solvent, and (c) be thermally stable. The difference in the boiling points of the solvent and scrubbing oil should be such as to permit ready separation by distillation. Preferably the scrubbing oil should boil at a temperature at least about 40 degrees F higher than the solvent and the latter should have a boiling point that is higher than that of the nitrile product (e.g. acrylonitrile) to permit separation therefrom by distillation. However, the boiling point of the solvent must not be so high in relation to that of the nitrile product as to require a large heat input for reboiling purposes in the lights and product columns. Preferably the solvent has a boiling point at least about 40° F higher than that of the nitrile product and at least about 100° F less than that of the scrubbing oil. The choice of scrubbing oil and solvent as far as their boiling points are concerned is also influenced by how much oil and solvent is to be allowed to go off in the overhead from the absorber to provide fuel values for the incinerator. The higher their boiling points, the less scrubbing oil and solvent appears in the absorber overhead. By way of example, a suitable scrubbing oil is a recycle gas oil boiling at about 550°F and a suitable solvent is a kerosene fraction boiling at about 350° F.

The following example illustrates a preferred mode of practicing the invention using the system illustrated in FIG. 2 of the drawing. Propylene, ammonia and air are reacted in reactor 2 which includes a catalyst bed that is fluidized by the incoming air stream. The catalyst may consist of the combined oxides of antimony and uranium prepared as described in U.S. Pat. No. 3427343. The propylene, air and ammonia are introduced at rates providing a molar ratio of oxygen to propylene of about 1.5 to 1 and a molar ratio of ammonia to olefin of about 1 to 1. The reaction is carried out at a temperature in the range of 750°–925°F and a pressure of about 25 psig. The reaction effluent has a composition approximately as set forth in Table I and is cooled to about 450°F before entering quench column 6 which is operated at a pressure of about 9.0 psig. Water and hydrocarbon solvent (consisting of a kerosene oil having a boiling point of about 350°F) are continually recovered from the quench column and returned to the quench column via line 18. Additional hydrocarbon solvent is recycled to the quench column from product column 42 via line 46. The water-solvent mixture returned via line 18 has a temperature of about 160°F; the hydrocarbon solvent delivered by line 46 is at a temperature of about 250°F to 290°F. As a consequence of contact with the reaction effluent, the water is vaporized and thereby effects cooling of the reaction effluent to an extent sufficient to condense any polymers present in the effluent. Sufficient water and hydrocarbon solvent are delivered to the quench column to cool the reaction effluent to about 180°F and to wash out of the bottom of the column any condensed polymers and any catalyst fines carried over from the reactor. The partially condensed reaction effluent recovered from the top of the quench column is cooled to about 160°F in quench cooler 16 before entering the absorber column 14A which is operated at an average temperature of about 165°F and an average pressure of about 5 psig. A scrubbing oil having a boiling point of about 540°F is delivered to the top end of the scrubbing section of the absorber column via lines 64 at a temperature of about 160°F- 165°F. Simultaneously solvent is fed to the absorber via line 49 at a temperature of about 160°F-165°F. In the lower section of absorber column 14A the partially condensed reaction effluent undergoes countercurrent contact with the solvent, with the result that the acrylonitrile is absorbed by solvent and recovered therewith as a bottoms product. Also absorbed by the solvent are any reaction by-products remaining in the reaction effluent recovered from the quench column that boil at a higher temperature than acrylonitrile. The remaining unabsorbed vapors of the reaction effluent plus solvent vapor pass up into the scrubbing section 60 of column 14A where all but a small amount of solvent is scrubbed out by the high-boiling scrubbing oil. The scrubbed gases pass out of the absorber column while a solvent-scrubbing oil mixture is removed from tray 62 via line 66. Substantially all of the ammonia, HCN and acetonitrile and most of the propionitrile present in the reaction effluent recovered from the quench tower appear in the off-gases that pass out of the top of the absorber. The absorber bottoms product is heated to about 350°F in passing through heat exchangers 20, 74 and 76 to the lights column 22. The latter column is operated at an average pressure of about 6.0 psig. with a bottom temperature of about 350°F and a top temperature of about 190°F. Solvent for reflux is introduced to the lights column via lines 48 and 51 at a temperature of about 190°F. The product column is operated at an average pressure of about 6 psia. With a bottom temperature of about 300°F and a top temperature of about 120°F. The overhead from product column 42 is recovered via line 52 and the bottoms fraction is recycled via lines 46, 48, 49 and 51 to quench column 6, absorber 14A and lights column 22. The solvent-scrubbing oil mixture recovered from absorber 14A is heated to about 395°F as it passes through heat exchanger 84 to oil recovery column 70. The latter is operated at a pressure of about 6 psia with a bottom temperature of about 400°F and an upper temperature of about 270°F. The bottoms product from column 70 is cooled to about 160°F as it passes through exchangers 84 and 92 back to the absorber via line 64, while, the overhead from the same column is cooled in condenser 94 50 about the same temperature in its return to columns 14A and 22 via line 96. During the run makeup hydrocarbon solvent and scrubbing oil are introduced via lines 102 and 100 respectively and off gases from absorber 14A are burned in incinerator 36. The overhead from product column 42 and the off gases from decanter 36 have compositions approximately as set forth in Table I (all values are on the basis of moles).

TABLE I

| COMPONENT | REACTOR EFFLUENT | QUENCH COLUMN BOTTOMS | OFF-GAS TO INCINERATOR | PRODUCT COLUMN OVERHEAD |
|---|---|---|---|---|
| "Non-Condensible Gases | 240 | 0 | 240 | 0 |
| Water | 830 | 0 | 830 | 0 |
| $NH_3$ | 50 | 0 | 50 | 0 |
| HCN | 50 | 0 | 50 | 0 |
| Acetonitrile | 5 | 0 | 5 | 0 |
| Acrylonitrile | 150 | 0 | 1 | 149 |
| Other $C_3$ Compounds* | 1 | 0 | 1 | 0 |
| Polymer By-products | Trace | Trace | 0 | 0 |
| Solvent | 0 | 1.5 | .05 | 0 |
| Scrubbing Oil | 0 | 0 | 1.0 | 0 |

*The Other $C_3$ compounds are acetone, acrolein, and propionitrile.

Thus all of the $HN_3$, HCN, acetonitrile, water and non - condensible gases present in the reaction effluent are removed and passed to the incinerator. Additionally, most of the propionitrile is passed to the incinerator and the remainder appears as impurity in the product column overhead.

It is to be noted that various types of quench, absorber, and distillation columns may be used in practicing the invention. By way of example, the absorber column may be a multi-tray or packed column. It also is contemplated that the lights column may be replaced by a stripper column with a feed to its top tray. The operating pressures of the various columns also may be varied but it is preferred that the absorber and lights column operate at near atmospheric pressure or at the back pressure of the incinerator.

Notable advantages of the invention are absence of need to add water to the system (the water present in the reactor effluent is sufficient for operation of the quench column) since water is continually recovered and recycled and since hydrocarbon solvent is available for quenching purposes, polymer by-products and entrained catalyst particles are removed almost entirely from the reactor effluent in the quench column, and fuel values in the off-gases passed to the incinerator can be controlled to within close limits. Still other advantages of the invention herein described are elimination of the waste water stripper, deletion of the absorber column refrigeration requirements, decreased land requirements for plant equipment, elimination of ammonium salt recovery equipment and corrosion problems attendant to handling sulfuric acid, and recovery of bottoms that may be disposed of by incineration rather than by biological treatment. Since incineration may be conducted so as to obtain complete combustion, the incinerator output can be controlled so as to meet governmental standards as to carbon monoxide content. Furthermore, the rate of solvent loss can be limited to what is required to satisfy incinerator fuel requirements.

It is recognized that the invention as above described is susceptible of modifications. Thus, the hydrocarbon solvent need not be a kerosene but may be aromatic or paraffinic, e.g., a light gas oil, and, whether or not a kerosene, it may have a boiling point that is lower or higher than 350°F. However, the solvent must meet these requirements: (a) will not form a solution with water, (b) is a solvent for the nitrile product, and (c) will not react with the nitrile product. It is preferred that the solvent have a boiling point low enough to permit a reasonably low temperature to be maintained in the bottom of the lights column since a high temperature will increase the likelihood or rate of side reactions that may consume the nitrile product. However, the boiling point of the solvent must not be so low that recovery equipment for the absorber-overhead becomes unreasonably large. For example, in the case of acrylonitrile, it is preferred that the solvent have a boiling point of not less than about 250°F and not more than about 425°F; and, in the case of methacrylonitrile, it is preferred that the solvent have a boiling point of not less than about 300°F and not more than about 450°F. Kerosene fractions, which typically have boiling points in the range of 350°–450°F, are preferred as solvents for acrylonitrile and methacrylonitrile since kerosene is not miscible with water and does not react with the nitrile. Another possible modification is to incinerate directly the overhead fraction obtained from the lights column or recycle it to the quench column instead of the absorber column. It also is appreciated that the same process may be used to recover by-product waste materials from the effluents of reactions for producing nitriles other than acrylonitrile and methacrylonitrile, notably effluents of reactions in which nitriles are formed by ammoxidation of other olefins, e.g., 2 - butenenitrile from 2 - butene; 2 - pentenenitrile from 2 - pentene; 2 - methyl - 2 - butenenitrile from 2-methyl - 2 - butene; 2 - hexenenitrile from 2 - hexene; 2 - methyl - 2 - pentenenitrile from 2 - methyl - 2 - pentene; 3 - methyl - 2 - pentenenitrile from 3 - methyl - 2 - pentene; 1, 4 - cyano 1, 4 - butadiene from 2, 4 - hexadiene; 1, 5 - cyano 1, 4 - pentadiene from 2, 4 heptadiene; benzonitrile from toluene; tolunitrile, phthalonitrile, iso- and terephthalonitrile from the xylene isomers; 1 - phenylpropene - nitrile from 1 - phenylpropene; naphthylnitrile from methylnaphthalene; 1, 4 - cyanonaphthalene from 1, 4 - dimethylnaphthalene; 1, 2, 4 - tricyanobenzene and 1, 3, 5 - tricyanobenzene from pseudocumene and mesytilene, respectively; 1, 2, 4, 5 - tetracyanobenzene from durene; and cyanopyridine from α picoline or from 2, 5 - lutidine; or by the ammoxidation of the corresponding saturated hydrocarbons to form the corresponding unsaturated nitriles, e.g., acrylonitrile from propane; methacrylonitrile from butane; etc.; or by the ammoxidation of aldehydes to form the corresponding nitrile, e.g., acrylonitrile from acrolein; methacrylonitrile from methacrolein, etc. Other reactions will be obvious and are known to those skilled in the art.

I claim:

1. A process for treating a gaseous mixture resulting from the catalytic vapor phase ammoxidation reaction of ammonia and oxygen with a member of the class consisting of propylene and isobutylene, said mixture comprising its corresponding unsaturated nitrile from the class consisting of acrylonitrile and methacrylonitrile, ammonia and reaction by-products comprising hydrogen cyanide, acetonitrile, acetone, acrolein, by-product polymers, and methacrolein or propionitrile, said process comprising adiabatically cooling said gaseous mixture in a quenching chamber by evaporation of at least one compatible vaporizable liquid medium supplied to said quenching chamber sufficiently to condense at least some of said polymer by-products of said reaction, said vaporizable liquid medium being a member of the group consisting of water and a hydrocarbon that is a solvent for said unsaturated nitrile, separating condensed by-product polymers from said gaseous mixture, contacting said gaseous mixture in an absorber chamber with a water-immiscible hydrocarbon absorption medium that is a nonreactive solvent for and has a boiling point higher than said unsaturated nitrile, whereby said unsaturated nitrile is absorbed by and forms a solution with said absorption medium, separating and recovering said solution and said gaseous mixture, scrubbing the gaseous mixture recovered from said absorber chamber to remove hydrocarbon absorption medium from said mixture, with a scrubbing agent that has a boiling point higher than that of said hydrocarbon absorption medium and that is non-reactive with said solvent and also with products of said reaction carried over in said gaseous mixture, treating said solution to recover an overhead fraction comprising by-products of said reaction carried over in said solution that have a boiling point lower than said unsaturated nitrile and a bottoms fraction comprising said unsaturated nitrile and said hydrocarbon absorption medium, treating said bottoms fraction to separately recover said unsaturated nitrile and said hydrocarbon absorption medium, and recycling at least a portion of said recovered hydrocarbon absorption medium to said absorber chamber.

2. A process according to claim 1 wherein said gaseous mixture is cooled in said quenching chamber by evaporation of water, and further including the step of recovering water as a liquid from the gaseous mixture recovered from said quenching chamber and recycling said recovered water to said quenching chamber.

3. A process according to claim 1 wherein said gaseous mixture is cooled in said quenching chamber by evaporation of water and further including the step of recovering water as a liquid from said gaseous mixture by cooling the gaseous mixture recovered from said absorber chamber, and recycling said recovered liquid water to said quenching chamber.

4. A process according to claim 1 wherein said gaseous mixture is cooled in said quenching chamber by evaporation of said hydrocarbon absorption medium, and further including the step of recovering said hydrocarbon absorption medium from the gaseous mixture recovered from said quenching chamber and returning said recovered hydrocarbon absorption medium to said quenching chamber.

5. A process according to claim 1 wherein said vaporizable liquid medium consists of water and said hydrocarbon absorption medium, and further including the steps of recovering water and hydrocarbon absorption medium from the gaseous mixture recovered from said absorbing chamber and recycling said recovered water and hydrocarbon absorption medium to said absorbing chamber.

6. A process according to claim 1 further including the steps of separately recovering hydrocarbon absorption medium and water from the gaseous mixture recovered from said absorber chamber, recycling said recovered water to said quenching chamber, and recycling said recovered hydrocarbon absorption medium to said absorber chamber.

7. A process according to claim 1 wherein said scrubbing agent is a hydrocarbon oil having a boiling point that is at least about 40°F higher than that of said hydrocarbon absorption medium.

8. A process according to claim 7 wherein said hydrocarbon oil has a boiling point at least about 100°F higher than the boiling point of said hydrocarbon absorption medium.

9. A process according to claim 1 wherein a mixture of said oil and said hydrocarbon absorption medium is recovered from said scrubbing step, and further including the steps of heating said mixture to obtain an oil fraction and a hydrocarbon absorption medium fraction, recycling at least part of said hydrocarbon absorption medium fraction to said absorber chamber and using at least part of said oil fraction to scrub additional gaseous mixture received from said absorber.

10. A process according to claim 1 wherein said unsaturated nitrile is acrylonitrile.

11. A process according to claim 1 wherein said unsaturated nitrile is methacrylonitrile.

* * * * *